US005616415A

United States Patent [19]

Lafond

[11] Patent Number: 5,616,415

[45] Date of Patent: *Apr. 1, 1997

[54] INSULATED ASSEMBLY INCORPORATING A THERMOPLASTIC BARRIER MEMBER

[76] Inventor: Luc Lafond, 23 Woodvalley Drive, Etobicoke, Ontario, Canada, M9A 4H4

[ * ] Notice: The term of this patent shall not extend beyond the expiration date of Pat. No. 5,441,779.

[21] Appl. No.: 477,950

[22] Filed: Jun. 7, 1995

Related U.S. Application Data

[63] Continuation-in-part of Ser. No. 871,016, Apr. 20, 1992, Pat. No. 5,441,779.

[30] Foreign Application Priority Data

Apr. 22, 1991 [CA] Canada .................................. 2040636

[51] Int. Cl.$^6$ .............................. B32B 9/04; C03C 27/00; E06B 7/12

[52] U.S. Cl. ....................... 428/411.1; 428/122; 428/480; 52/172; 52/786.13; 156/109; 49/475.1; 49/483.1

[58] Field of Search .................................. 428/34, 411.1, 428/480, 122, 343, 9.3; 52/786.1, 786.13, 172; 156/107, 109; 49/475.1, 483.1

[56] References Cited

U.S. PATENT DOCUMENTS

| | | | |
|---|---|---|---|
| 3,027,608 | 4/1962 | Ryan | 428/34 |
| 4,335,166 | 6/1982 | Lizando et al. | 428/34 |
| 4,658,553 | 4/1987 | Shinagana | 428/34 |
| 5,128,181 | 7/1992 | Kunert | 428/34 |
| 5,441,779 | 8/1995 | Laford | 428/34 |

*Primary Examiner*—Donald Loney
*Attorney, Agent, or Firm*—McFadden, Fincham

[57] ABSTRACT

There is disclosed an insulating strip and assembly suitable for use with glass substrates. The strip includes a continuous self supporting integral layer, for example, of a polyethylene terephthalate overlying sealant material and a continuous axial channel for independently receiving desiccant material. The strip provides enhanced insulation capacity with high adhesiveness.

14 Claims, 1 Drawing Sheet

INSULATED ASSEMBLY INCORPORATING A THERMOPLASTIC BARRIER MEMBER

This application is a continuation-in-part application of U.S. application Ser. No. 07/871,016 filed Apr. 20, 1992 and allowed on Mar. 7, 1995 now U.S. Pat. No. 5,441,779.

FIELD OF THE INVENTION

This invention relates to an insulated assembly and, more particularly, it relates to an insulated glass assembly incorporating a thermoplastic barrier member.

BACKGROUND OF THE INVENTION

Insulated assemblies presently known in the art incorporate the use of various polymeric substances in combination with other materials. One such assembly includes a butylated polymer in which there is embedded an undulating metal spacer. Although useful, this type of sealant strip is limited in that the metal spacer, over time, becomes exposed to the substrates which results in a drastic depreciation in the efficiency of the strip. The particular difficulty arises with moisture vapour transmission when the spacer becomes exposed and contacts the substrates.

Further, many of the butylated polymers currently used in insulated glass assemblies are impregnated with a desiccant. This results in a further problem, namely decreased adhesiveness of the butylated sealant.

Generally, the greater the amount of desiccant within the sealant the lower the adhesiveness of the sealant to the substrates. Evidently, if an improper seal or ineffective seal exists between two substrates positioned on the sealant strip, the capability of the strip to insulate is greatly limited with additional problems in the form of vapour condensation between the substrates interiorly of the assembly.

Other insulated assemblies employ sealant means which include polyurethane and silicone foams, shrink film hot compounds etc. which results in a bulky and expensive strip which adds even greater expense to an insulated assembly.

In view of the obvious limitations illustrated in the existing technology for insulated glass assemblies, there is a need for an assembly which provides strongly adhesive sealant means using lightweight, highly insulative materials which is additionally unaffected by exposure to ultraviolet light and the present invention fulfills this need.

SUMMARY OF THE INVENTION

One object of the present invention is to provide an improved sealant strip for use in insulated glass assemblies.

Another object of the present invention, there is provided a sealant strip adapted for use between a pair of opposed surfaces including a continuous length of sealant means having substrate engaging surfaces and a pair of opposed surfaces, the improvement wherein the sealant means comprises a non-desiccated sealant means having continuous desiccant receiving means extending inwardly of one of the opposed surfaces and adapted to receive a desiccant therein, a continuous self supporting integral layer extending between the substrate engaging surfaces and in contact with the desiccant receiving means, and desiccant means adapted for reception within the desiccant receiving means.

A further object of the present invention, the sealant means may comprise a body of a suitable thermoplastic material such as the polyolefins, polyamides, polyvinylchlorides or the like.

Suitable polymeric materials which are moisture and air impermeable are polyethylene terephthalate and nylon.

The thermoplastic material of the body is preferably completely devoid of any desiccant material since the presence of desiccants within the body reduces the adhesiveness of the thermoplastic material.

The sealant means, according to the present invention, includes a desiccant receiving means therein in the form of a continuous channel extending inwardly of one of the opposed surfaces. The channel may be formed by placing a pair of continuous lengths of the sealant material, in a spaced apart relationship, along one of the opposed surfaces of the sealant strip. The sealant strip i.e. the three components may be extruded simultaneously using known extrusion methods and apparatus.

A still further object of the present invention, there is provided a method of forming an insulated glass assembly comprising providing an adhesive continuous length sealant strip having a pair of glass lite engaging surfaces and a pair of opposed surfaces and a continuous channel extending inwardly from one of the opposed surfaces, providing a continuous self supporting integral layer, positioning the layer between the glass lite engaging surfaces and in contact with the channel, providing a pair of glass lites, and mounting a glass lite to each of the glass lite engaging surfaces.

With respect to the desiccant means, preferably the desiccant means comprises a continuous length of desiccant material of suitable profile. Generally, it is preferred that the length of desiccant form a width suitable for reception within the channel of the sealant means and having a profile which is readily received within the channel e.g. a circular cord, triangular, etc. Depending on the type of desiccant material employed, various desiccant may be produced and utilized in the form in which they are manufactured such as a continuous ribbon or circular profile. In other cases, where the desiccant is of a non-self sustaining form, the desiccant may be enclosed in a suitable material, such as a thin thermoplastic tubing possessing air permeability characteristics, which can then be inserted as strip or ribbon into the insulating body. In this way, even particulate desiccants can be employed, retained by suitable tubing, where such desiccant could not otherwise normally be employed except for dispersion into the insulating body in a discrete particulate form. Typical desiccants are well known by those skilled in the art and the choice of a suitable desiccant will depend on the particular application desired.

Yet another object of the present invention, there is provided an insulated glass assembly comprising non-desiccated sealant means having a pair of glass lite engaging surfaces and a pair of opposed surfaces substantially continuous desiccant receiving means, extending inwardly of one of the opposed surfaces adapted to receive a desiccant therein, a continuous self supporting integral layer extending between the opposed surfaces, a pair of glass substrates adapted for engagement with the glass lite engaging surfaces, and desiccant means within the desiccant receiving means.

The self supporting layer incorporated in the present invention preferably extends at least the width of the opposed surfaces and overly at least one of the same. The layer is preferably positioned between and in adhesive contact with the pair of continuous lengths of sealant means and the sealant strip.

Having thus generally described the invention, reference will now be made to the accompanying drawings illustrating preferred embodiments.

DETAILED DESCRIPTION OF THE PREFERRED EMBODIMENTS

Figure 1:
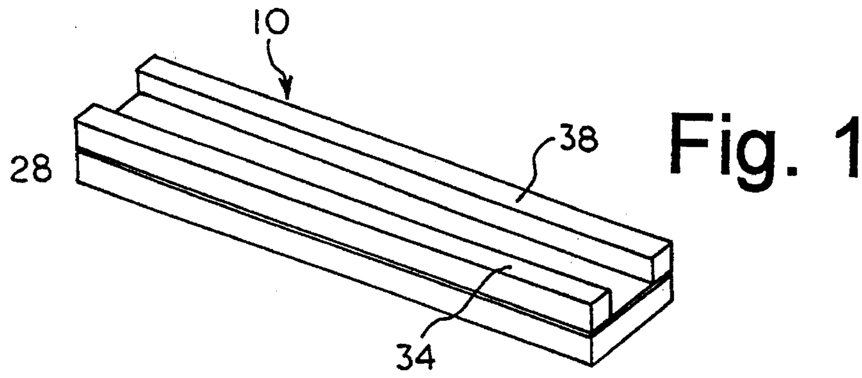
FIG. 1 is a perspective view of a sealant strip in accordance with the present invention.

Referring to the Figures shown is a perspective view of the sealant strip 10 according to the present invention. The sealant strip 10 includes a pair of opposed surfaces 12 and 14 and a pair of substrate engaging surfaces 16 and 18. Further, the sealant strip 10 provides first and second spaced apart elongated lengths of sealant means 20 and 22 (discussed hereinafter) each of which include substrate engaging surfaces 30 and 32, respectively. The first and second sealant means and the sealant strip all are continuous and comprise, in one possible form, a butylated polymer such as those known in the art for insulated glass assemblies.

Generally, the butylated polymers, hot melts etc. have inherent tackiness and readily adhesively engaged substrate surfaces, such as glass, plexiglass and other such forms of plastics to provide a substantial seal with a surface engaged. This seal becomes even more effective when the butyl polymer is completely devoid of any desiccant material interspersed thereon. As such, it is particularly preferred that the sealant strip 10 and sealant means 20 and 22 be free of any desiccant material.

Figure 2:
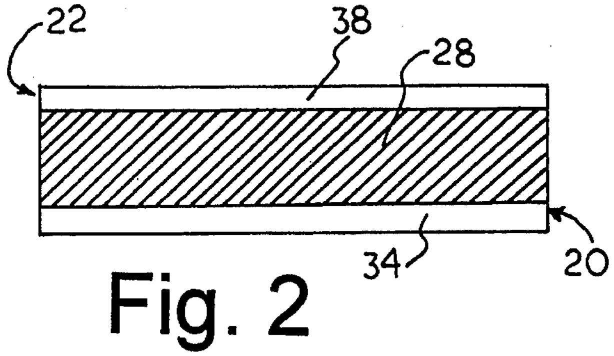
FIG. 2 is a top plan view of the strip of FIG. 1.
Figure 3:
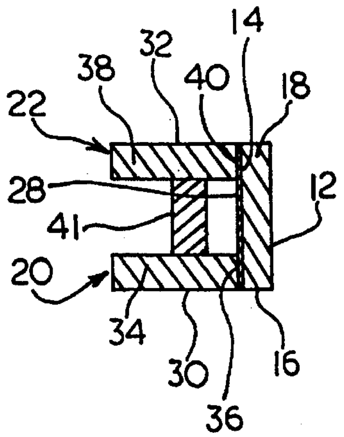
FIG. 3 is a side elevation view of the strip of FIG. 1.

Referring now to FIGS. 2 and 3, shown is a top view and a side elevational view of the strip 10. It is particularly preferred that a continuous self supporting integral layer 28 of a polymeric material such polyethylene terephthalate at least extends between the substrate engaging surfaces 16 and 18 and overlies at least one of the opposed surfaces 12 or 14. The opposed surface on which the layer 28 is mounted preferably extends inwardly of the assembly, shown in FIG. 3.

The sealant strip 10, comprising a material which has adhesive properties, herein previously described, readily adhesively engages the layer 28.

In a preferred form, the polyethylene terephthalate material comprises Mylar® although suitable congeners of this polyethylene terephthalate known to those skilled in the art will function adequately. Another suitable material is nylon.

Applicant, by incorporating the polyethylene terephthalate layer 28 has found that this is particularly effective as a barrier to moisture penetration and losses in insulation capacity in insulated glass assemblies.

Sealant means 20 and 22 comprise continuous elongated lengths of a similar material as strip 10 and include at least one substrate engaging surface 30 and 32, as well as a pair of opposed surfaces 34 and 36 and 38, 40, respectively.

Each of the sealant means 20 and 22 preferably overlie layer 28 in adhesive engagement therewith along opposed surfaces 36 and 40 thereof. Further, the sealant means 20 and 22 are preferably positioned on layer 28 in such a manner so that they are spaced apart to define an axial channel while engaging surfaces 30 and 32 are in a substantially coplanar relationship with engaging surfaces 16 and 18, respectively, of strip 10.

In this arrangement, the strip engaging surfaces 16 and 18 and the engaging surfaces 30 and 32 of sealant means 20 and 22 provide adhesive surfaces for a glass lite to be positioned on each respective surface as illustrated in FIG. 3.

Referring now to the desiccant means 41, it is preferred that the desiccant comprise a substantially continuous elongated length. Suitable desiccants include, for example, zeolites, calcium chloride, silica gel or any other suitable hygroscopic material known to those skilled in the art.

The desiccant may be dispersed in a suitable carrier matrix to provide a semi-solid form e.g. silicone. Disposition of the desiccant within the matrix material chosen will allow moisture penetration therein.

The desiccant means 41 may be of any suitable profile e.g. circular, triangular, etc. for reception within the channel herein previously described. When the continuous desiccant means 41 is positioned between the sealant means 20 and 22, it is retained therein due to the adhesive nature thereof.

Figure 4:
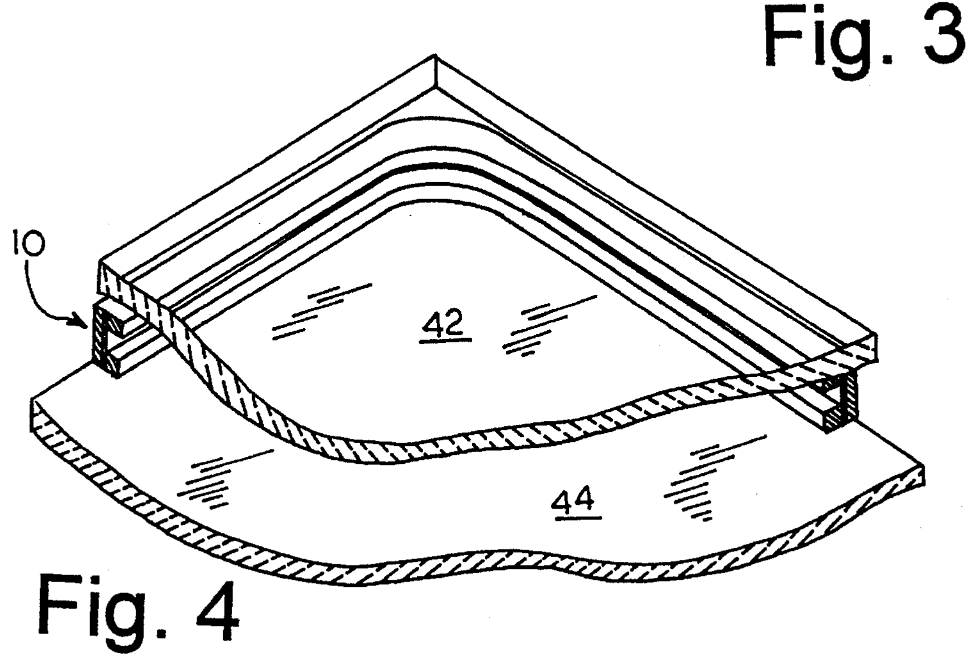
FIG. 4 is a perspective view of the strip of FIGS. 1, 2 and 3 in situ between substrates.

FIG. 4 illustrates the strip 10 as positioned between a pair of opposed glass lites 42 and 44. The substrate engaging surfaces 16 and 18 of the strip 10 as well as the substrate engaging surfaces 30 and 32 of sealant means 20 and 22 adhesively engage the lites 42 and 44 with the desiccant facing the interior atmosphere of the area contained by the opposed lites 42 and 44.

Applicant has found that if layer 28 extending between the substrate engaging surfaces 16 and 18 and controls the interior surface of the individual lites 42 and 44, that a substantial increase in the capacity for the strip 10 to block moisture transmission is achieved.

As those skilled in the art will realize, these preferred illustrated details can be subjected to substantial variation, without affecting the function of the illustrated embodiments. Although embodiments of the invention have been described above, it is not limited thereto and it will be apparent to those skilled in the art that numerous modification form part of the present invention insofar as they do not depart from the spirit, nature and scope of the claimed and described invention.

I claim:

1. In a sealant strip adapted for use between a pair of opposed surfaces including a continuous length of sealant means having substrate engaging surfaces and a pair of opposed surfaces, the improvement wherein:

said sealant means comprises a non-desiccated sealant means having continuous desiccant receiving means extending inwardly of one of said opposed surfaces;

a continuous self supporting integral layer extending between said substrate engaging surfaces and in contact with said desiccant receiving means; and desiccant means positioned in said desiccant receiving means.

2. The sealant strip as defined in claim 1, said self supporting layer comprising polyethylene terephthalate.

3. The sealant strip as defined in claim 1, wherein said sealant means further includes first and second sealant means.

4. The sealant strip as defined in claim 1, wherein said self supporting layer overlies at least one of said opposed surfaces.

5. The sealant strip as defined in claim 4, wherein said self supporting layer extends at least between said substrate engaging surfaces.

6. The sealant strip as defined in claim 3, wherein said first and second sealant means comprise separate and continuous lengths of sealant means adapted for adhesive engagement with a surface of said layer other than the surface overlying said at least one of said opposed surfaces.

7. The sealant strip as defined in claim 6, wherein said first and second sealant means adhesively engage said layer in a spaced apart relationship.

8. The sealant strip as defined in claim 1, wherein said desiccant receiving means comprises a continuous channel.

9. A method of forming an insulated glass assembly comprising:

providing an adhesive continuous length sealant strip having a pair of glass lite engaging surfaces and a pair of opposed surfaces and a continuous channel extending inwardly from one of said opposed surfaces;

providing a continuous self supporting integral layer;

positioning said layer between said glass lite engaging surfaces and in contact with said channel;

providing a pair of glass lites; and mounting a glass lite to each of said glass lite engaging surfaces.

10. The method as defined in claim 9, said self supporting layer comprising polyethylene terephthalate.

11. The method as defined in claim 9, further including the step of providing separate first and second continuous lengths of sealant means.

12. The method as defined in claim 11, further including the step of providing adhesively engaging said first and second lengths of said sealant means in a spaced apart relationship on said layer thereby defining said channel.

13. The method as defined in claim 9, further including the step of providing a continuous length of desiccant means.

14. The method as defined in claim 13, further including the step of positioning said length of desiccant means within said channel.

* * * * *